United States Patent [19]
Rehage

[11] Patent Number: 5,850,770
[45] Date of Patent: Dec. 22, 1998

[54] SECURING DEVICE FOR WORKPIECE SPINDLE OF LATHE

[75] Inventor: Gerhard Rehage, Guetersloh, Germany

[73] Assignee: Gildemeister Aktiengesellschaft, Bielefeld, Germany

[21] Appl. No.: 648,343

[22] Filed: May 15, 1996

[30] Foreign Application Priority Data

Jun. 22, 1995 [DE] Germany .................... 195 22 711.5

[51] Int. Cl.⁶ .................................................. B23B 31/10
[52] U.S. Cl. ................................................. 82/142; 82/165
[58] Field of Search ................... 82/142, 165; 279/125, 279/157

[56] References Cited

U.S. PATENT DOCUMENTS

| | | | |
|---|---|---|---|
| 2,836,992 | 6/1958 | Byam | 82/142 X |
| 4,386,544 | 6/1983 | Fuminier | 82/165 X |
| 4,829,861 | 5/1989 | Brown et al. | 82/142 |

FOREIGN PATENT DOCUMENTS

| | | |
|---|---|---|
| 0358531B1 | 3/1994 | European Pat. Off. . |
| 2102878 | 8/1972 | Germany . |

*Primary Examiner*—A. L. Pitts
*Assistant Examiner*—Henry W. H. Tsai
*Attorney, Agent, or Firm*—Michael J. Striker

[57] ABSTRACT

A securing device for a workpiece spindle of a lathe includes a spindle housing having a plane surface and rotatably supporting a workpiece spindle, a brake disk non-rotatably connectable with the workpiece spindle, a clamping device for fixing the brake disk and mounted on the spindle housing, the brake disk being formed as a disk which is rigid in a circumferential direction and is bending-resistant in a direction of a spindle axis, the disk being pressable by the clamping device against the plane surface of the spindle housing.

5 Claims, 2 Drawing Sheets

SECURING DEVICE FOR WORKPIECE SPINDLE OF LATHE

BACKGROUND OF THE INVENTION

The present invention relates to a securing device for a workpiece spindle of a lathe.

More particularly, it relates to a securing device for a workpiece spindle of a lathe with a brake disk connected for joint rotation with a workpiece spindle which is supported in a spindle housing, and with a clamping device for securing the brake disk supported in the spindle housing.

Such a securing device is disclosed for example in the patent document DE-OS 21 02 878 and EP 03 58 531 B1. The brake disk mounted on the workpiece spindle is secured by at least two pistons which are opposite to one another and displaceably arranged in a U-shaped housing.

The piston housing can be mounted on a spindle box For machining of a workpiece held in a chuck of the workpiece spindle with rotatably driven tools, tangentially acting, alternating forces are applied to the workpiece and thereby to the workpiece spindle. Since the piston must be supported in the piston housing with play because of its displacement, such operational forces lead to a rotary vibration of the workpiece spindle and thereby to an inaccurate machining.

SUMMARY OF THE INVENTION

Accordingly, it is an object of the present invention to provide a securing device for a workpiece spindle of a lathe, which avoids the disadvantages of the prior art.

More particularly, it is an object of the present invention to provide a securing device which is formed so that a positioning of the workpiece spindle which is play-free in a peripheral direction is obtained, and the workpiece spindle must assume any rotary angle position.

In keeping with these objects and others which will become apparent hereinafter, one feature of the present invention resides, briefly stated, in a securing device for a workpiece spindle of a lathe with a brake disk connected for joint rotation with the workpiece spindle which is supported rotatably in a spindle housing and with a clamping device for fixing the clamping disk which is mounted on the spindle housing, wherein in accordance with the present invention, the brake disk is composed of a disk which is rigid in a peripheral direction and bending-elastic in the direction of the spindle axis and is pressable by the clamping device against a plane surface of the spindle housing.

When the securing device is designed in accordance with the present invention, it avoids the disadvantages of the prior art and provides for the above-mentioned advantages.

Because of the frictional connection between the spindle housing and the brake disk which is mounted on the workpiece spindle for joint rotation with it, at no point of the force flux there is a place which can allow the vibrations. While the brake disk must be elastically deformable in the direction of the spindle axis, its circumferential rigidity is very high.

The effect of the inventive device can be achieved with simple means when the brake disk is pressed directly against the spindle housing by a piston acting at one side on the brake disk.

The brake disk, in accordance with another embodiment of the present invention, can be arranged immediately near the rear wall the spindle housing.

In accordance with still a further feature of the present invention, the brake disk can be mounted on a clamping disk which is connected non-rotatably with the workpiece spindle.

Finally, a plane friction surface can be provided on the spindle housing or on a part which is fixably connected with the spindle housing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 2:
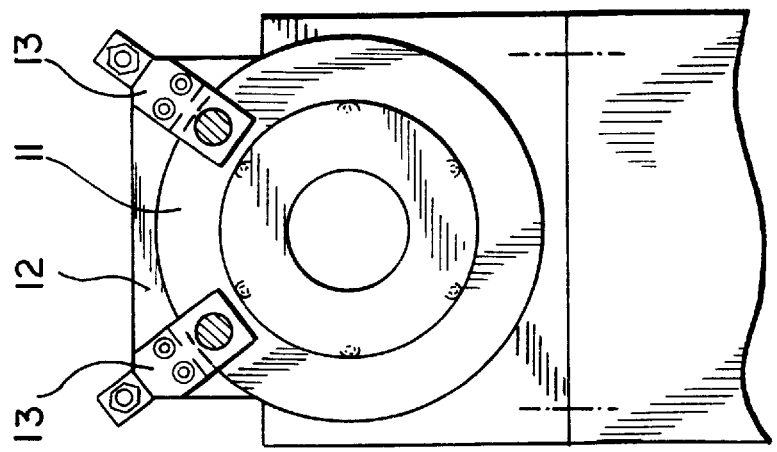
FIG. 2 is a side view of the spindle housing in accordance with the present invention.
Figure 1:
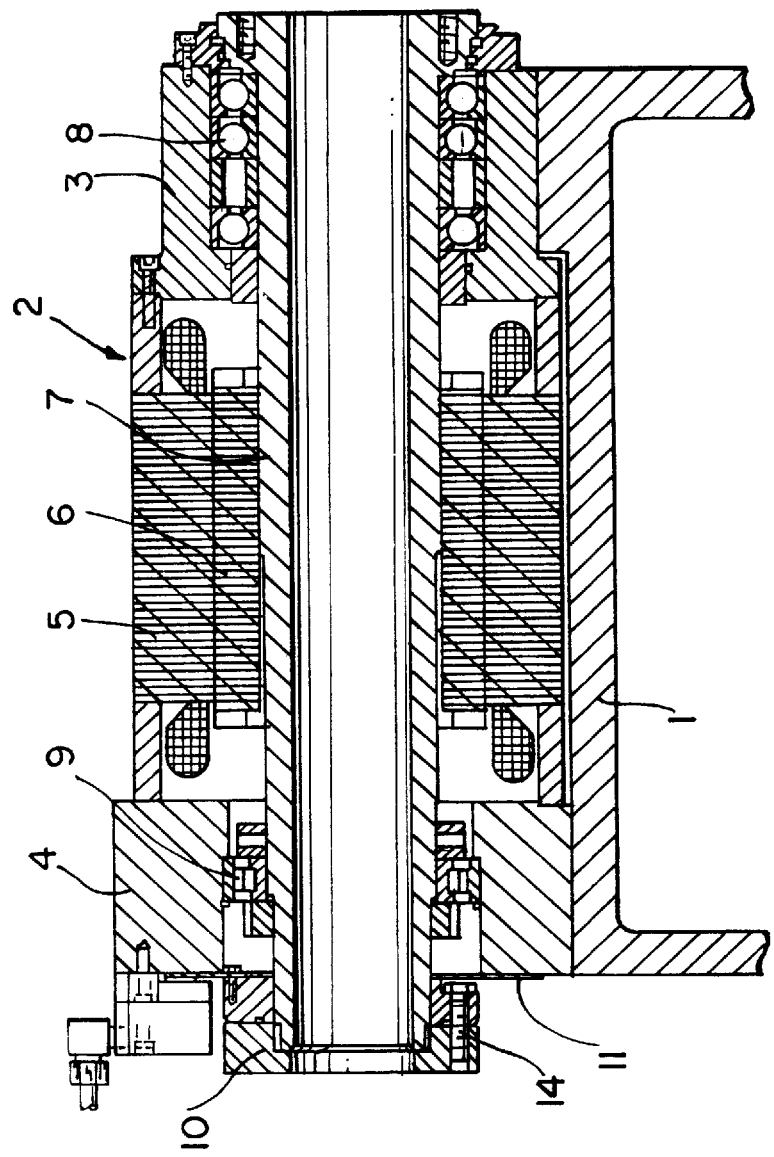
FIG. 1 is a view showing a spindle housing with a drive motor having an integrated workpiece spindle, of a securing device in accordance with the present invention.

A securing device for a workpiece spindle of a lathe in accordance with the present invention has a console identified with reference numeral 1. A spindle housing 2 is mounted on the console. The spindle housing substantially is composed of a front spindle bearing flange 3 and a rear spindle bearing flange 4. A stator 5 of a spindle drive is clamped between the front spindle bearing flange 3 and the rear spindle bearing flange 4.

The spindle drive has a drive motor with a rotor 6 which is mounted directly on a workpiece spindle 7. The workpiece spindle 7 is rotatably supported in the front spindle bearing flange 3 by an inclined ball bearing 8 and is also supported in the rear spindle bearing flange 4 by a roller bearing 9. A clamping ring 10 is arranged on the rear end of the workpiece spindle 7. A brake disk 11 is mounted on a brake disk support 15, and a clamping device 12 is mounted on the rear spindle bearing flange 4 of the spindle housing 2.

As can be seen from FIG. 2, the clamping ring 12 is composed of two clamping units 13. The clamping units 13 act on the brake disk 11. When an even number of the clamping units 13 are arranged on the opposite side of the workpiece spindle 7, the securing device operates free of transverse forces.

Figure 3:
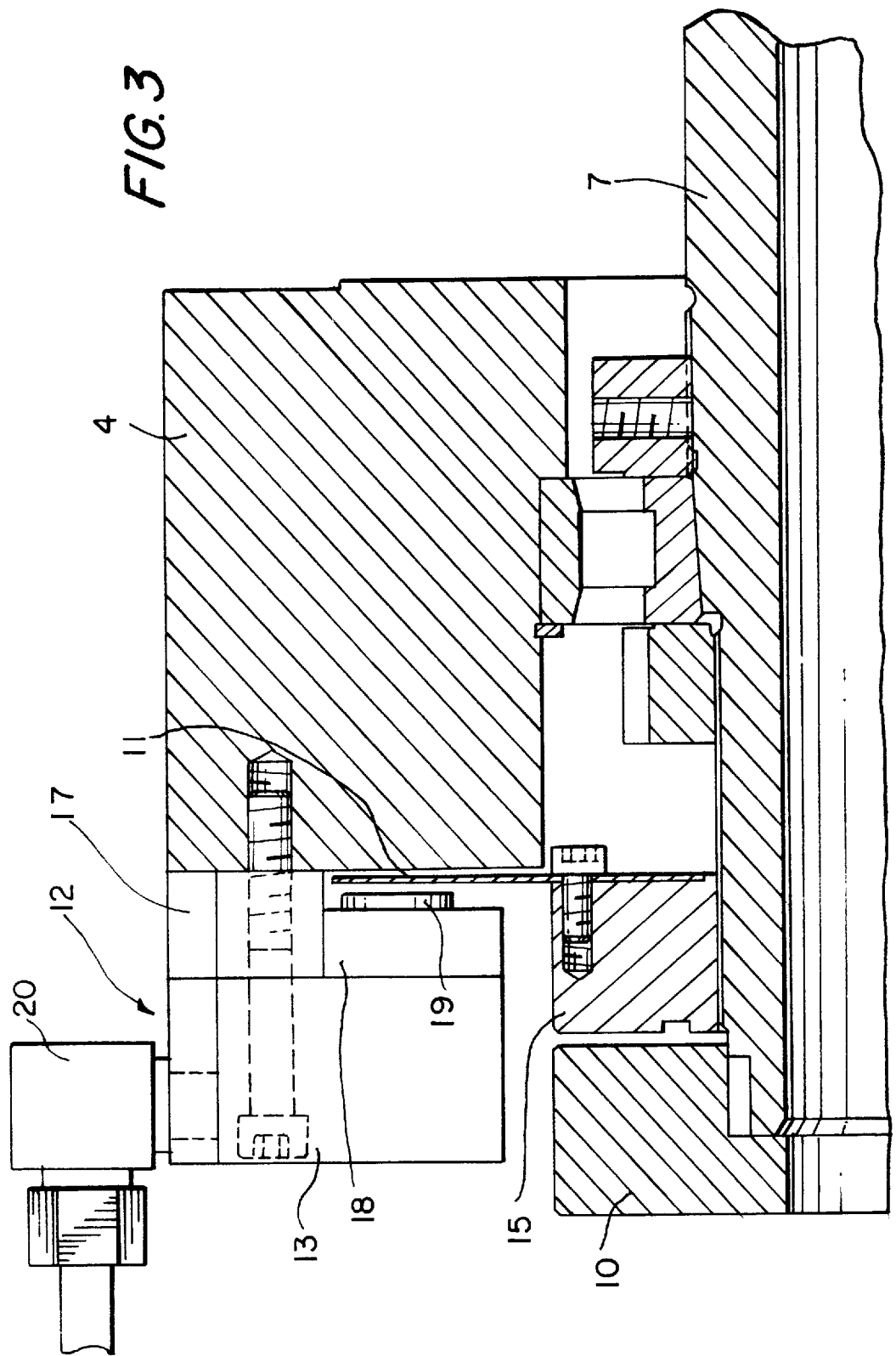
FIG. 3 is a view showing a cross section of the left end of the spindle housing of the inventive securing device of FIG. 1, on an enlarged scale.

FIG.3 shows the clamping device 12 on an enlarged scale. The clamping ring is non-rotatably mounted on the rear end of the workpiece spindle 7. The brake disk support 15 is mounted on the clamping ring 10 by screws 14. The brake disk support 15 is fixedly connected with the brake disk 11. This allows an adjustment of a distance from the brake disk 11 to the rear spindle bearing flange 4 of the spindle housing 2. The clamping unit 13 is mounted by screws on the spindle bearing flange 4 through a spacer member 17.

The clamping unit 13 carries a cylinder 18 of a pressure cylinder-piston unit. The cylinder-piston unit has a piston 19 which is displaced in the cylinder 18 under the action of a pressure medium. The pressure medium is supplied to the pressure cylinder-piston unit through a supply element 20 and not-shown conduits.

Under the action of the piston 19, the brake disk 11 is elastically deformed and abuts against the wall of the spindle bearing flange 4. The workpiece spindle 7 is thereby secured in a play-free manner by this frictional connection.

It will be understood that each of the elements described above, or two or more together, may also find a useful application in other types of constructions differing from the types described above.

While the invention has been illustrated and described as embodied in securing device for workpiece spindle of lathe, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A securing device for a workpiece spindle of a lathe, comprising a spindle housing having a plane surface and rotatably supporting a workpiece spindle; a brake disk non-rotatably connectable with the workpiece spindle; a clamping device for fixing said brake disk and mounted on said spindle housing, said brake disk being formed as a disk which is rigid in a circumferential direction and is bending-elastic in a direction of a spindle axis, said disk being pressable by said clamping device against said plane surface of said spindle housing; and a clamping ring which is non-rotatably connectable with the workpiece spindle, said brake disk being mounted on a brake disk support which is mounted on said clamping ring.

2. A securing device as defined in claim 1, wherein said clamping device includes at least one displaceable piston which acts on said brake disk at one side.

3. A securing device as defined in claim 1, wherein said spindle housing has a rear wall, said brake disk being arranged immediately near said rear wall of said spindle housing.

4. A securing device as defined in claim 1, wherein said surface of said spindle housing is a frictional surface and is formed directly on said spindle housing.

5. A securing device as defined in claim 1, wherein said plane surface on said spindle housing is a frictional surface; and further comprising an additional element fixedly connected with said spindle housing, said frictional surface being formed on said additional element.

\* \* \* \* \*